(12) United States Patent
Maruta et al.

(10) Patent No.: US 10,849,047 B2
(45) Date of Patent: Nov. 24, 2020

(54) BEACON

(71) Applicant: Where, Inc., Tokyo (JP)

(72) Inventors: Hajime Maruta, Tokyo (JP); Takeshi Ohyama, Tokyo (JP); Shingo Fujishima, Tokyo (JP)

(73) Assignee: Where, Inc., Tokyo (JP)

( * ) Notice: Subject to any disclaimer, the term of this patent is extended or adjusted under 35 U.S.C. 154(b) by 0 days.

(21) Appl. No.: 16/343,104

(22) PCT Filed: Oct. 17, 2017

(86) PCT No.: PCT/JP2017/037540
§ 371 (c)(1),
(2) Date: Apr. 18, 2019

(87) PCT Pub. No.: WO2018/079342
PCT Pub. Date: May 3, 2018

(65) Prior Publication Data
US 2019/0320377 A1 Oct. 17, 2019

(30) Foreign Application Priority Data
Oct. 25, 2016 (JP) .................................. 2016-208690

(51) Int. Cl.
*H04W 40/24* (2009.01)
*H04W 56/00* (2009.01)
(Continued)

(52) U.S. Cl.
CPC ........... *H04W 40/244* (2013.01); *H04W 4/38* (2018.02); *H04W 52/0261* (2013.01); *H04W 56/001* (2013.01); *H04W 84/18* (2013.01)

(58) Field of Classification Search
CPC ... H04W 4/38; H04W 40/244; H04W 56/001; H04W 84/10
See application file for complete search history.

(56) References Cited

U.S. PATENT DOCUMENTS 6,745,036 B1 6/2004 Dunne et al.
7,367,497 B1 5/2008 Hill
(Continued)

FOREIGN PATENT DOCUMENTS

EP 3091722 A1 11/2016
JP 2002-533692 A 10/2002
(Continued)

OTHER PUBLICATIONS

Search Report in International Application No. PCT/JP2017/037540 dated Dec. 12, 2017, 4 pages.
(Continued)

*Primary Examiner* — Gbemileke J Onamuti
(74) *Attorney, Agent, or Firm* — Marshall, Gerstein & Borun LLP

(57) ABSTRACT

The objective of the present invention is to control a beacon in a mesh beacon. A system contains a plurality of beacons which are capable of communicating with one another within a prescribed radio wave reaching distance and which transmit and receive prescribed signals, each of the plurality of beacons being disposed within the radio wave reaching distance of at least one other beacon, and a control device capable of communicating with at least one of the plurality of beacons. Each beacon is provided with: a receiving unit for receiving a signal including a setting change instruction sent from the control device; a setting unit for changing the setting value of a prescribed item in the device on the basis of the setting change instruction; and a transmitting unit for transmitting a signal including information based on the setting value changed by the setting means to the control device.

2 Claims, 9 Drawing Sheets

(51) Int. Cl.
*H04W 4/38* (2018.01)
*H04W 52/02* (2009.01)
*H04W 84/18* (2009.01)

(56) References Cited

U.S. PATENT DOCUMENTS

| | | |
|---|---|---|
| 2002/0186166 A1 | 12/2002 | Spratt |
| 2007/0081514 A1 | 4/2007 | Shirokura et al. |
| 2007/0201423 A1* | 8/2007 | Laroia ................. H04W 40/244 370/345 |
| 2008/0307075 A1 | 12/2008 | Urano et al. |
| 2013/0342399 A1* | 12/2013 | Fukuda ..................... G01S 1/02 342/386 |
| 2017/0311222 A1 | 10/2017 | Yamashita et al. |
| 2018/0014181 A1 | 1/2018 | Nakahara |
| 2018/0054698 A1 | 2/2018 | Park et al. |
| 2018/0313944 A1 | 11/2018 | Park et al. |
| 2019/0208492 A1* | 7/2019 | Maruta ..................... G01S 5/14 |

FOREIGN PATENT DOCUMENTS

| | | |
|---|---|---|
| JP | 2006-229845 A | 8/2006 |
| JP | 2008-175734 A | 7/2008 |
| JP | 2008-199360 A | 8/2008 |
| JP | 2008-306472 A | 12/2008 |
| JP | 2009-088750 A | 4/2009 |
| JP | 2010-016576 A | 1/2010 |
| JP | 2012-205108 A | 10/2012 |
| JP | 2014-025910 A | 2/2014 |
| JP | 2014-529947 A | 11/2014 |
| JP | 2015-149526 A | 8/2015 |
| JP | 5792412 B1 | 10/2015 |
| WO | WO-2006/001074 A1 | 1/2006 |
| WO | WO-2006/009497 A1 | 1/2006 |
| WO | WO-2007/084673 A2 | 7/2007 |
| WO | WO-2013/025824 A1 | 2/2013 |
| WO | WO-2016/023901 A1 | 2/2016 |
| WO | WO-2016/099888 A1 | 6/2016 |
| WO | WO-2016/107726 A1 | 7/2016 |
| WO | WO-2016/113884 A1 | 7/2016 |

OTHER PUBLICATIONS

International Preliminary Report on Patentability and Written Opinion in International Application No. PCT/JP2017/037540 dated May 9, 2019, 7 pages.
Partial Supplementary European Search Report in EP 17853213.1 dated Apr. 28, 2020, 11 pages.
Office Action in JP Application No. 2016-186733 dated Jun. 16, 2020.
Search Report in International Application No. PCT/JP2017/034590 dated Dec. 19, 2017, 4 pages.
International Preliminary Report on Patentability and Written Opinion in International Application No. PCT/JP2017/034590 dated Apr. 4, 2019, 11 pages.
Extended European Search Report in EP Application No. 17864144.5 dated Feb. 7, 2020, 8 pages.

* cited by examiner

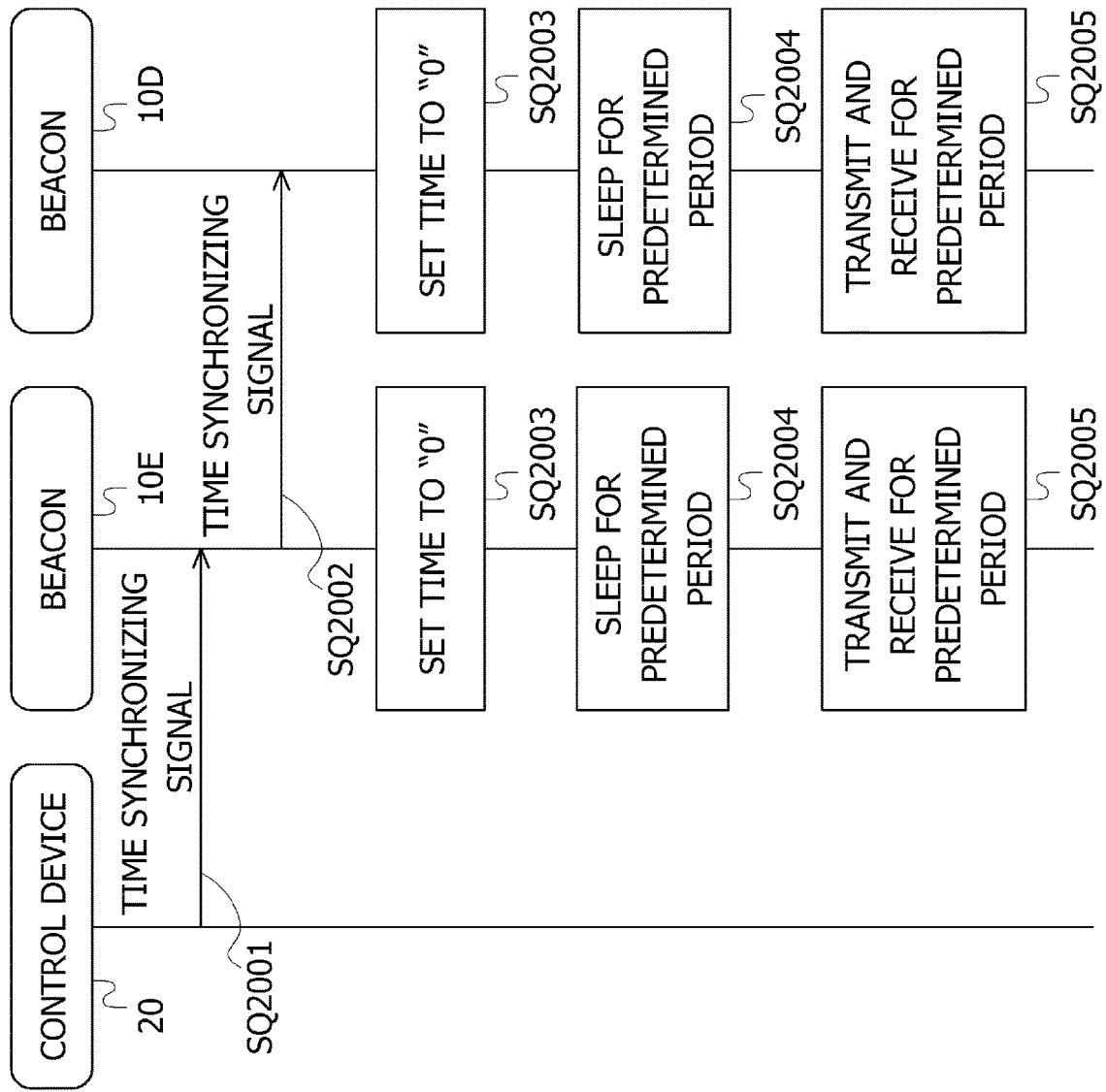

BEACON

TECHNICAL FIELD

The present invention pertains to a beacon.

BACKGROUND ART

There exists a beacon (radiophare) to notify a receiver of various items of information instanced by positions by emitting electromagnetic waves. Some of the beacons are configured to transmit the information toward mobile computers. For example, some of the beacons for the mobile computers utilize Bluetooth (registered trademark), and receive pieces of identifying information from a plurality of transmitters, whereby computers on a receiving side are enabled to know self-positions.

With respect to the beacon configured to transmit the information toward a moving object exemplified by an automobile equipped with a receiver, such an information communication system is proposed that a wireless communication monitoring device transmits transmission level information of the beacon to the beacon, thereby adjusting a transmission level of the beacon.

DOCUMENTS OF PRIOR ARTS

Patent Documents

[Patent Document 1] International Publication WO 2006/001074

[Patent Document 2] Japanese Patent Publication No. 2015-149526

SUMMARY

Problems to be Solved by the Invention

There is a technology of configuring a beacon mesh by a plurality of beacons. Each of the beacons (also termed mesh type beacons) configuring the beacon mesh has a function of performing mutual communications with other beacons installed a radio wave reachable distance, and the beacons as a whole configure a multi-hop wireless network. The mesh type beacon transmits a radiophare containing self-identifying-information to other beacons. The beacon mesh is connectable to other networks via a gateway. The gateway is capable of transmitting a setting change instruction individually to the beacons within the beacon mesh. The gateway is, however, hard to recognize a result of the setting change in each beacon.

The present invention aims at providing a technology of controlling beacons in mesh type beacons.

Means for Solving the Problems

The following means is adopted for solving the problems.

To be specific, according to a first aspect, there is provided a beacon in a system including: a plurality of beacons enabled to perform mutual communications within a predetermined radio wave reachable distance and transmitting and receiving predetermined signals, each of the plural beacons being disposed within the radio wave reachable distance of at least one of other beacons; and a control device enabled to perform the communications with at least one of the plural beacons, the beacon including:

receiving unit to receive a signal containing a setting change instruction issued from the control device;

setting unit to change a setting value of a predetermined item of a self device, based on the setting change instruction; and transmitting unit to transmit a signal containing information based on the setting value changed by the setting unit toward the control device.

The aspects of the disclosure may also be attained in such a way that an information processing apparatus runs programs. In other words, a configuration of the disclosure may be specified as a program for making the information processing apparatus execute processes to be executed the respective unit in the aspects described above, or as a non-transitory computer readable recording medium recorded with the program. The configuration of the disclosure may also be specified as a method by which the information processing apparatus executes the processes to be executed by the respective unit. The configuration of the disclosure may further be specified as a system including the information processing apparatus that executes the processes to be executed by the respective unit.

Effect of the Invention

According to the present invention, it is feasible to control beacons in mesh type beacons.

BRIEF DESCRIPTION OF THE DRAWINGS

FIG. 9 is a sequence chart illustrating an example of an operation sequence when synchronizing the time in the beacons within the beacon mesh.

DESCRIPTION OF EMBODIMENTS

Mode for Carrying Out the Invention

An embodiment of the present invention will hereinafter be described with reference to the drawings. A configuration of the embodiment is an exemplification, and a configuration of the invention is not limited to a specific configuration of the embodiment of the disclosure. A specific configuration corresponding to the embodiment may be properly adopted on the occasion of carrying out the invention.

Embodiment

<System Configuration>

Figure 1:
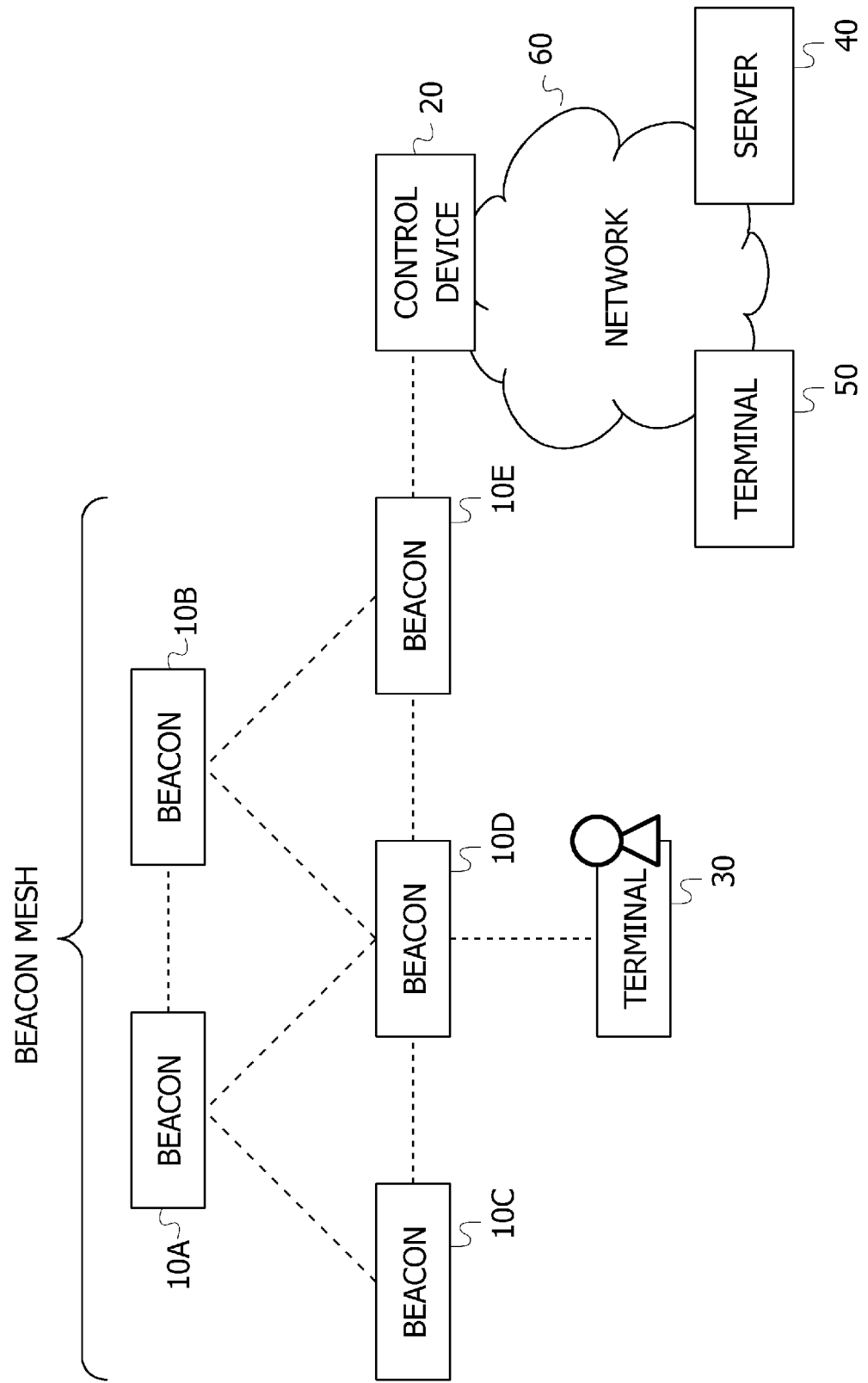
FIG. 1 is a diagram illustrating an example of a configuration of a system according to an embodiment.

FIG. 1 is a diagram illustrating an example of a configuration of a system according to the embodiment. Note that a radiophare transmitted and received for measuring a position and other equivalents and a transmitting device of the radiophare will be each called a "beacon" in the embodiment. The system according to the embodiment includes beacons 10 (beacons 10A through 10E in FIG. 1), a control device 20, a terminal 30, a server 40, and a terminal 50. The terminal 30 exists in a receivable position of a signal from any one of the beacons 10. The terminal 30 is, e.g., carried by a user or attached to a predetermined object. The control device 20, the server 40 and the terminal 50 are interconnected via a network 60 instanced by the Internet. The terminal 30 may also be connected to the network 60. The beacons 10A through 10E configure a multi-hop wireless network.

The beacon 10 transmits a radiophare that contains identifying information and a transmission day/time. The beacon 10 according to the embodiment has a function of performing mutual communications with other beacons 10 installed within a reachable distance of radio waves, thus configuring the multi-hop wireless network on the whole. Each of the plural beacons is to be disposed within the reachable distance of the radio waves of at least one of other beacons. The beacon 10 receives the identifying information of the terminal 30 from this terminal 30. The beacon 10 transmits, to other beacons 10, the identifying information of the beacon 10 itself together with the identifying information received from the terminal 30, a reception strength of the signal transmitted from the terminal 30, and information indicating a status and other items of the beacon 10. The information indicating the status and other items of the beacon 10 may contain information received from other beacons 10. Note that the plurality of beacons enabled to perform the communications with each other is generically called a "beacon mesh". FIG. 1 depicts the five beacons 10, and a number of the beacons 10 is not, however, limited to "5". The beacon 10 includes, e.g., a microcontroller and an antenna, and attains a variety of functions by getting these components to cooperate with each other. The beacon 10 may include a variety of sensors as internal sensors. The variety of sensors are, e.g., a camera, a microphone, a thermometer, a hygrometer, an optical sensor, an infrared-ray sensor, an electricity meter, a gas meter, a water meter, and a measuring instrument. The variety of sensors detect videos, images, sounds, values and other equivalents. The variety of sensors may be connected as external sensors to the beacon 10. The beacon 10 is capable of measuring a residual quantity of a self built-in battery. The external sensor may have a wireless communication function attained by Bluetooth and other equivalent technologies. In this case, the external sensor may transmit a detection result by being carried on a packet of the Bluetooth.

The control device 20 is a device that unitarily controls operations of the plurality of beacons 10. The control device 20 transmits, to the peripheral beacons 10, specifying information containing the identifying information for identifying any one of the plurality of beacons 10 and predetermined items of information. On the other hand, the beacon 10 relays the received specifying information to the peripheral beacons 10 and, when receiving the specifying information containing the identifying information that identifies the beacon 10 itself, executes a predetermined process based on the specifying information.

The specifying information may contain, e.g., information for controlling an operation of the beacon 10. The control device 20 operates as a gateway for establishing a connection between the beacon mesh and the network 60.

The terminal 30 receives the radiophare from the beacon 10. The terminal 30 transmits the identifying information for identifying the terminal 30 itself to the beacon 10. FIG. 1 depicts one terminal, and a number of the terminals 30 is not, however, limited to "1". The terminal 30 may have a function as the beacon 10. For example, the terminal 30 may function as one of the beacons 10 within the beacon mesh. The terminal 30 may, similarly to the beacon 10, include the internal sensors and may also be connected to the external sensor. The terminal 30 is carried by a user and attached to a movable object.

The server 40 acquires, from the terminal 30 via the beacon mesh, a set of data of the identifying information of the beacons 10 and the transmission day/time contained in the radiophares, the reception day/time of the radiophares in the terminal 30 and the identifying information of the terminal 30. The server 40 may acquire the information indicating the status of the beacon 10. The server 40 outputs the acquired information via the network 60 to the terminal 50 and other equivalent terminals. Note that the server 40 may also output information corresponding to the terminal 30.

The terminal 50 is connected to the network 60 and receives the information and other equivalent items of the terminal 30 from the server 40. FIG. 1 illustrates one terminal 50, and a number of the terminals 50 is not, however, limited to "1".

<Functional Configuration of Beacon>

Figure 2:
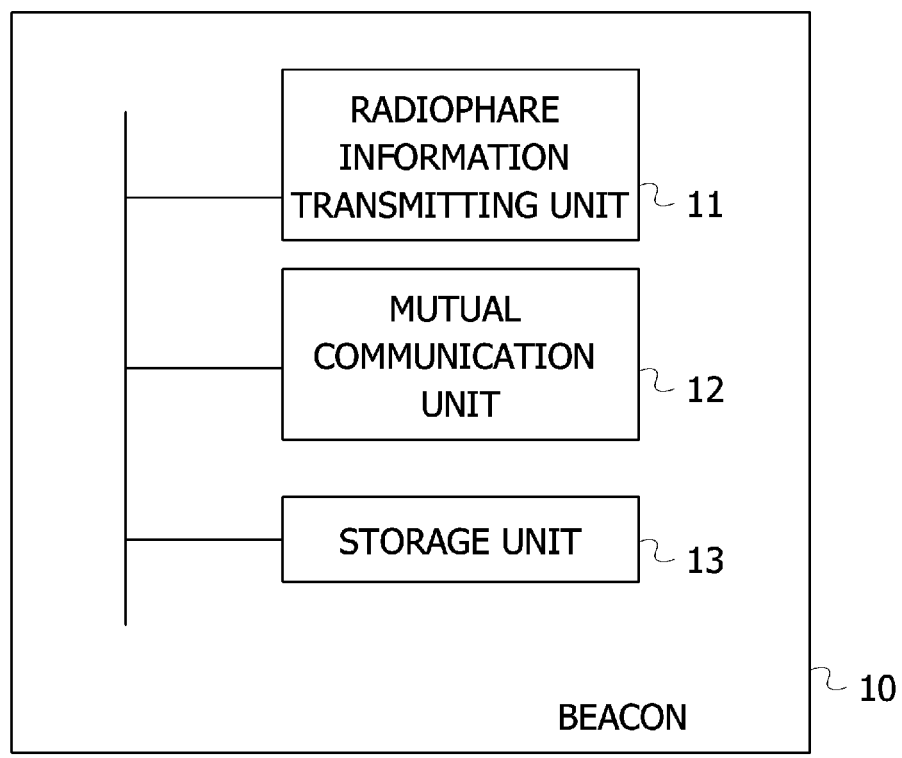
FIG. 2 is a diagram illustrating an example of function blocks of a beacon 10.

FIG. 2 is a diagram illustrating an example of function blocks of the beacon 10 according to the embodiment. Note that the plurality of beacons 10 is installed at an interval equal to or shorter than a predetermined radio wave reachable distance enabling the mutual communications between the beacons within a station yard of a subway and other equivalents, an underground street, a building, a tunnel and other equivalent structures. The beacons 10 are to be installed at the interval of, e.g., about 10 m corresponding to an installing location. The beacon 10 includes a radiophare information transmitting unit 11, a mutual communication unit 12 and a storage unit 13.

The radiophare information transmitting unit 11 transmits, based on the information retained in the storage unit 13, the radiophare containing the identifying information for identifying the beacon 10, and thus gives a proximity notification to the device on a receiving side. The radiophare may contain day/time information and other equivalent information indicating the transmission time. To be specific, it is feasible to utilize a technology exemplified by BLE (Bluetooth Low Energy), and a broadcast communication of the radiophare may be performed.

The mutual communication unit 12 transmits and receives the information bidirectionally to and from other beacons 10, the terminal 30 and the control device 20. For example, the mutual communications may be performed based on a profile instanced by GATT (Generic Attribute profile) of BLE. The mutual communication unit 12 may also perform connection-oriented communications. The mutual communication unit 12, when receiving the specifying information containing pieces of identifying information of other beacons 10, relays the specifying information to the peripheral beacons 10. On the other hand, when receiving the specifying information containing the identifying information identifying the mutual communication unit 12 itself, the mutual communication unit 12 stores the specifying information in the storage unit 13, and executes a predetermined process based on the specifying information. The mutual communication unit 12 receives from the terminal 30 a signal containing the terminal ID of the terminal 30. The mutual communication unit 12 measures reception strength of the received signal. The mutual communication unit 12 stores information contained in the received signal and the signal reception strength in the storage unit 13 by being associated with each other.

The mutual communication unit 12 may, in response to a request given from the control device 20, give a response of the information retained in the storage unit 13 to the control device 20 via the beacon mesh network. The information retained in the storage unit 13 may contain items of information acquired by the internal sensors and the external sensors. Unique identifying information may be previously allocated to the information instanced by the specifying information transmitted and received between the beacons 10. Hereat, the mutual communication unit 12 stores the identifying information of the once-transferred information in the storage unit 13, then checks, when transferring the information, whether the identifying information of the information concerned is coincident with the identifying information of the information transferred in the past to the storage unit 13, and may not transfer the information concerned when being the information transferred in the past. It is thereby feasible to avoid a continuous transfer of the same information within the beacon mesh.

The storage unit 13, which is a nonvolatile memory, is attained by, e.g., an EEPROM (Electrically Erasable Programmable Read-Only Memory) instanced by a flash memory possessed by the microprocessor. The storage unit 13 stores the identifying information of the predetermined beacons 10 and a setting value of strength of the radio waves when the radiophare information transmitting unit 11 transmits the radiophare. The storage unit 13 stores the information contained in the received signal and the signal reception strength.

<Functional Configuration of Control Device>

Figure 3:
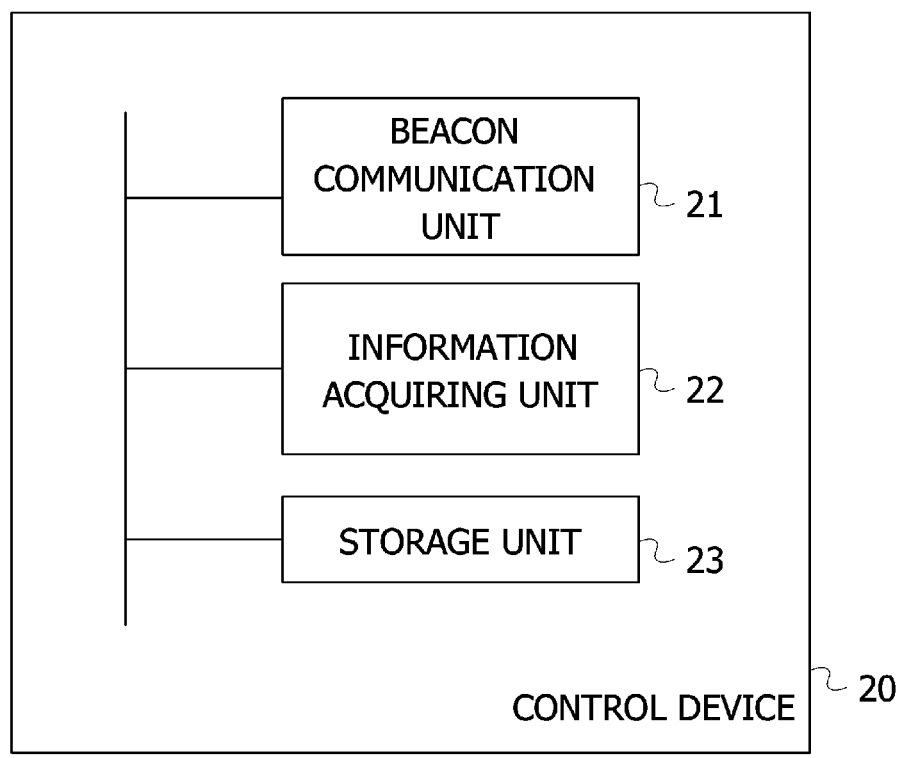
FIG. 3 is a diagram illustrating an example of function blocks of a control device 20.

FIG. 3 is a diagram illustrating an example of function blocks of the control device 20 according to the embodiment. The control device 20, which is, e.g., a general type of computer, includes a beacon communication unit 21, information acquiring unit 22 and a storage unit 23. The beacon communication unit 21 performs the bidirectional communications with the beacon 10. To be specific, the beacon communication unit 21 transmits the specifying information described above, and receives alive information from the beacon 10 and the information retained by the beacon 10. The control device 20 may also be connected to one beacon 10 by a cable and other equivalent methods in a communication-enabled manner.

The information acquiring unit 22 acquires predetermined information from an unillustrated device via the network 60 exemplified by the Internet and a private line. The information acquiring unit 22 causes, based on an input from the user operating the control device 20, the beacon communication unit 21 to transmit the specifying information and to change settings of the beacon 10. The information acquiring unit 22 may acquire the information from the respective beacons 10. The beacon 10 may also send the same specifying information only once by the broadcast communication in such a way that the specifying information contains pieces of identifying information associated with all of the beacons 10. The specifying information is configured to contain a hop count indicating how many times the specifying information is transferred on the beacon mesh network, then the beacon 10 increments the hop count each time setting change information is transferred, and the specifying information transferred between the beacons 10 by a predetermined number of times may be deleted from on the beacon mesh.

The storage unit 23 is attained by, e.g., an HDD (Hard Disk Drive), an SSD (Solid State Drive), the flash memory and other equivalent storages. The storage unit 13 stores pieces of positional information indicating the installing locations of the plurality of beacons 10, operation settings and other equivalent items by being associated with the identifying information (beacon IDs) of the respective beacons.

<Functional Configuration of Terminal>

Figure 4:
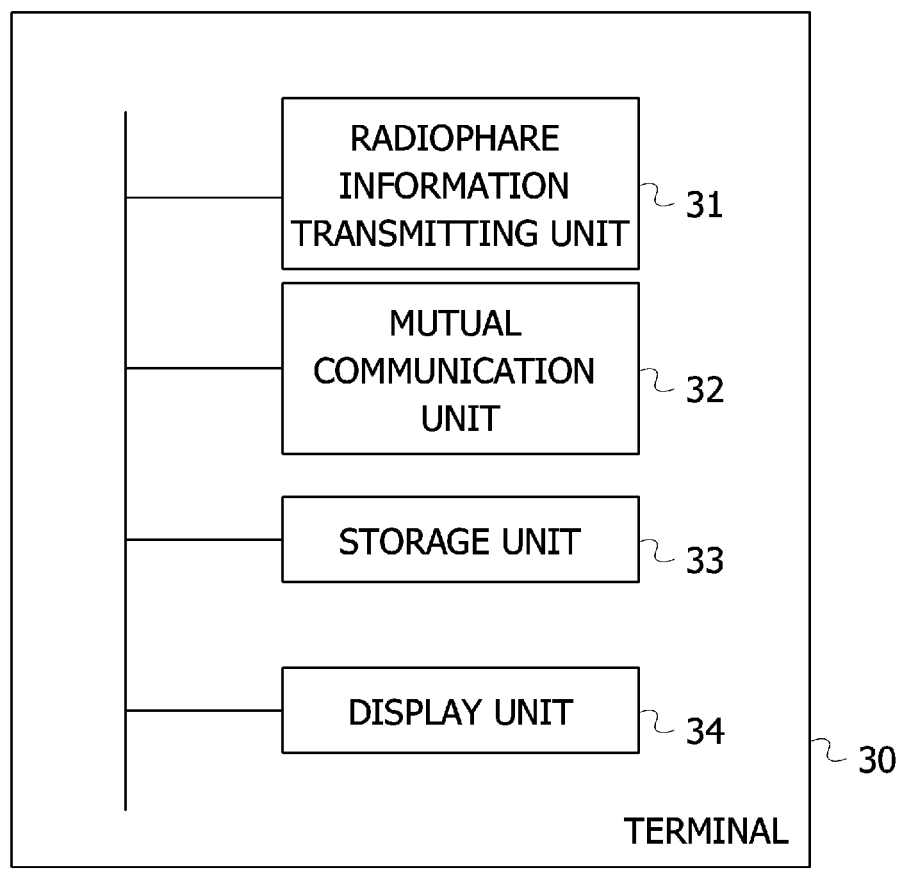
FIG. 4 is a diagram illustrating an example of function blocks of a terminal 30.

FIG. 4 is a diagram illustrating an example of function blocks of the terminal 30 according to the embodiment. The terminal 30, which is instanced by a smartphone and a computer like a slate PC, includes a radiophare information transmitting unit 31, a mutual communication unit 32, a storage unit 33, and a display unit 34. Note that the radiophare information transmitting unit 31 and the mutual communication unit 32 are attained based on application software (also called a program) installed in, e.g., the terminal 30 by utilizing the communication function of the terminal 30.

The radiophare information transmitting unit 31 transmits, based on the information retained in the storage unit 33, the radiophare containing the identifying information for identifying the terminal 30 as the beacon 10, and thus gives the proximity notification to the device on the receiving side. The radiophare may contain the day/time information indicating the transmission time. Specifically, the technology such as BLE (Bluetooth Low Energy) may be utilized, and the broadcast communications of the radiophare may be performed. The radiophare (information) containing the identifying information of the terminal 30, which is transmitted by the terminal 30, is receivable by the plurality of beacons.

The mutual communication unit 32 transmits and receives the information bidirectionally to and from other beacons 10, the terminal 30 and the control device 20. For example, the mutual communications may be performed based on the profile instanced by a GATT (Generic Attribute profile) of the BLE. The mutual communication unit 32 may also perform connection-oriented communications. The mutual communication unit 32, when receiving the specifying information containing pieces of identifying information of other beacons 10, relays the specifying information to the peripheral beacons 10. On the other hand, when receiving the specifying information containing the identifying information identifying the mutual communication unit 32 itself, the mutual communication unit 32 stores the specifying information in the storage unit 33, and executes a predetermined process based on the specifying information. The mutual communication unit 32 may, in response to a request given from the control device 20, give a response of the information retained in the storage unit 33 to the control device 20 via the beacon mesh network.

The mutual communication unit 32 receives the radiophare transmitted by the beacon 10, and stores the received radiophare in the storage unit 33. The storage unit 33 is a volatile memory or the nonvolatile memory. For instance, the storage unit 33 is attained by the RAM (Random Access Memory), the ROM (Read Only Memory) and the EEPROM like the flash memory. The mutual communication unit 32 transmits, to the server 40 via the beacon mesh, the radiophare stored in the storage unit 33, the reception day/time of the radiophare and the identifying information for specifying the terminal 30. Note that the identifying information for specifying the terminal 30 may involve using an ID provided by an OS (Operating System) of the smartphone and other equivalent devices, and the server 40 may also issue unique identifying information to the application software of the terminal 30.

The storage unit 33 is attained by, e.g., the HDD (Hard Disk Drive), the SSD (Solid State Drive), the flash memory and other equivalent storages. The storage unit 33 stores the identifying information for identifying the terminal 30, which is sent from the terminal 30. The storage unit 33 stores pieces of positional information indicating the installing locations of the plurality of beacons 10 by being associated with the identifying information (beacon IDs) of the respective beacons.

The display unit 34 displays the positional information and other items of information stored in the storage unit 33 on a monitor provided in the terminal 30.

<Functional Configuration of Server>

Figure 5:
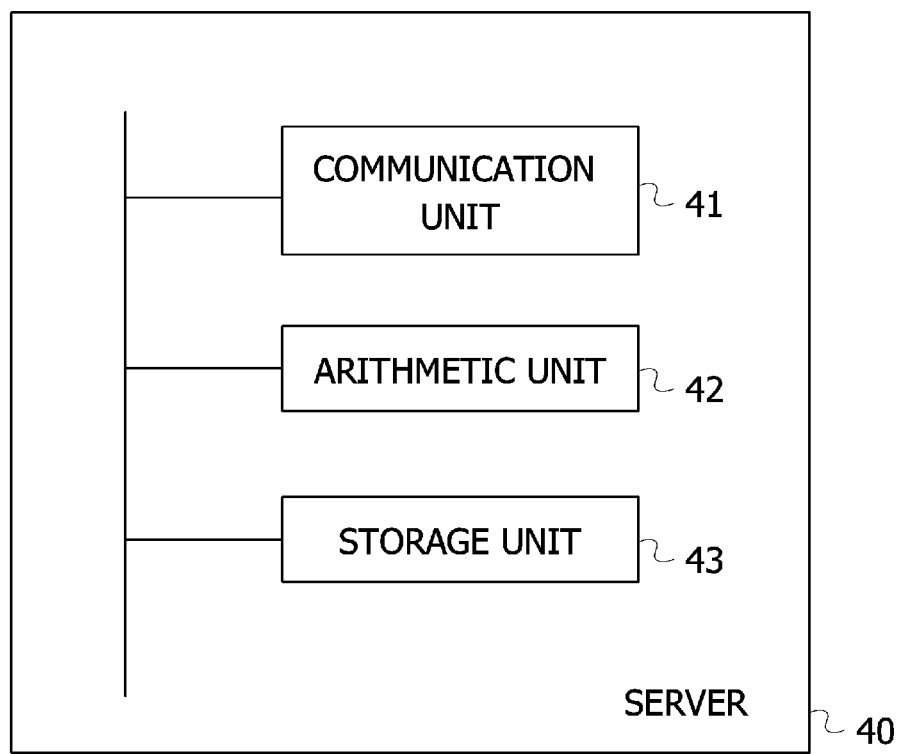
FIG. 5 is a diagram illustrating an example of function blocks of a server 40.

FIG. 5 is a diagram illustrating an example of function blocks of an information providing server 40 according to the embodiment. The server 40, which is, e.g., a desktop computer, includes a communication unit 41, an arithmetic unit 42 and a storage unit 43. The control device 20 and the server 40 may be configured integrally to operate as one control device.

The communication unit 41 transmits and receives the information to and from the control device 20 and the terminal 50 via the network 60 instanced by the Internet. As described above, the communication unit 41 receives the information containing the identifying information of the terminal 30 from the terminal 30 via the beacon mesh and the control device 20, and stores the received information in the storage unit 43.

The arithmetic unit 42 performs a predetermined arithmetic operation, based on the information given from the beacon 10 and the terminal 30. The arithmetic unit 42 calculates an existing position of, e.g., the terminal 30.

The storage unit 43, which is configured by, e.g., the HDD, the SSD or the flash memory, stores the information received from the terminal 30 via the beacon mesh and the control device 20 and the information indicating the position, calculated based on the received information, of the terminal 30, and may previously store, in addition to these items of information, information on the periphery of the position in which the beacon 10 is installed. The storage unit 43 stores the identifying information (beacon IDs) of the beacons 10 configuring the beacon mesh and the positional information indicating the existing positions of the beacons by being associated with each other.

<Functional Configuration of Terminal>

Figure 6:
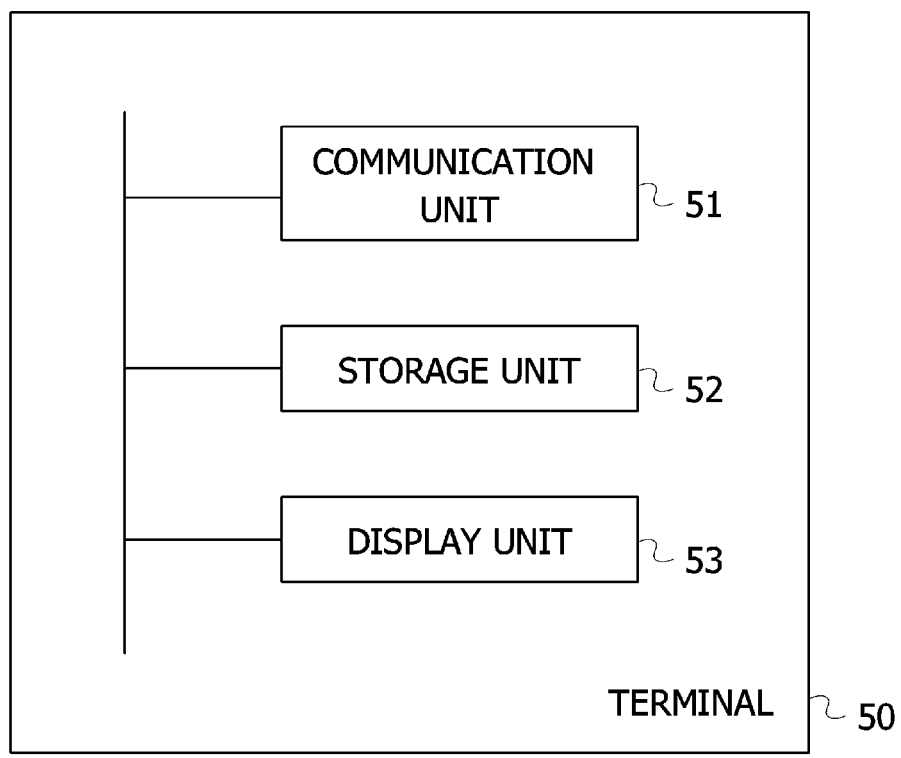
FIG. 6 is a diagram illustrating an example of function blocks of a terminal 50.

FIG. 6 is a diagram illustrating an example of function blocks of the terminal 50 according to the embodiment. The terminal 50, which is, e.g., the computer, includes a communication unit 51, a storage unit 52 and a display unit 53.

The communication unit 51 transmits and receives the information to and from the server 40 via the network 60 instanced by the Internet. As described above, the communication unit 51 receives the information containing the positional information of the terminal 30 from the server 40, and stores the received information in the storage unit 52.

The storage unit 52, which is configured by the HDD, the SSD or the flash memory, stores the information received from the server 40. The storage unit 52 stores the positional information, received from the server 40, of the terminal 30. The storage unit 52 may store a map covering an area (underground street and other equivalent areas) in which the beacons 10 configuring the beacon mesh are installed.

The display unit 53 displays the positional information, stored in the storage unit 52, of the terminal 30 and other items of information on the monitor provided in the terminal 50.

<Configuration of Device>

The control device 20, the terminal 30 and the terminal 50 are each attainable by using a dedicated or general-purpose computer instanced by the smartphone, a mobile phone, a tablet terminal, a car navigation system, a PDA (Personal Digital Assistant), a PC (Personal Computer), or an electronic equipment mounted with the computer. The server 40 is attainable by using the dedicated or general-purpose computer instanced by the PC and a Work Station (WS), or the electronic equipment mounted with the computer.

Figure 7:
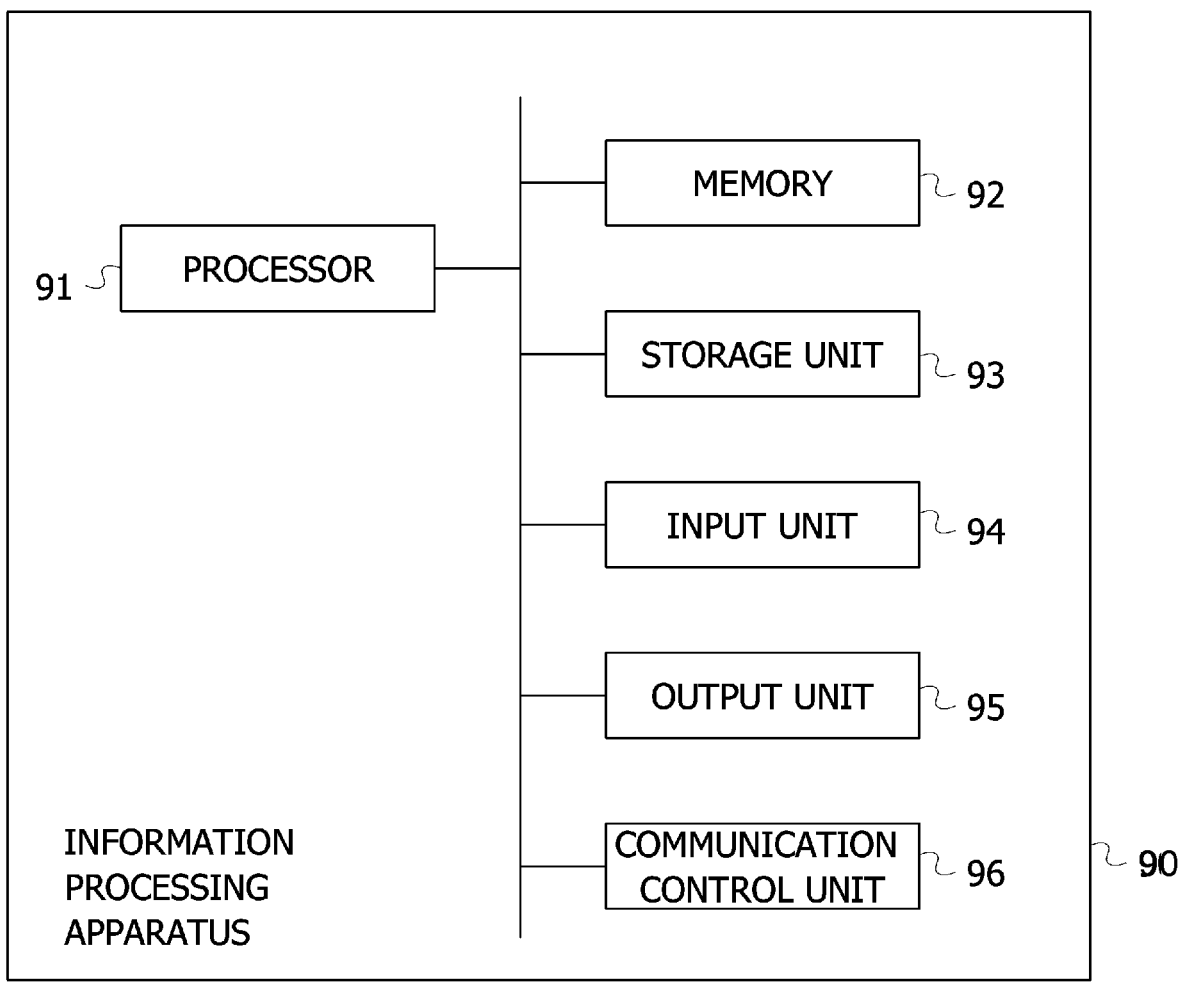
FIG. 7 is a diagram illustrating an example of a hardware configuration of an information processing apparatus.

FIG. 7 is a diagram illustrating an example of a hardware configuration of an information processing apparatus. An information processing apparatus 90 illustrated in FIG. 7 has a configuration of the general type of computer. The control device 20, the terminal 30, the server 40 and the terminal 50 are each attained by the information processing apparatus 90 as depicted in FIG. 7. The information processing apparatus 90 includes a processor 91, a memory 92, a storage unit 93, an input unit 94, an output unit 95, and a communication control unit 96. These components are interconnected via a bus. The memory 92 and the storage unit 93 are the non-transitory computer readable recording mediums. The hardware configuration of the information processing apparatus may properly, without being limited to the example illustrated in FIG. 7, omit, replace and add the components.

The processor 91 loads programs stored on the recording medium into a working area of the memory 92, and the configurative units are controlled through running the programs, thereby enabling the information processing apparatus 90 to attain functions matching with predetermined purposes.

The processor 91 is instanced by a CPU (Central Processing Unit) and a DSP (Digital Signal Processor).

The memory 92 includes, e.g., the RAM (Random Access Memory) and the ROM (Read Only Memory). The memory 92 is also called a main storage device.

The storage unit 93 is instanced by an EPROM (Erasable Programmable ROM), the HDD (Hard Disk Drive) and the SSD (Solid State Drive). The storage unit 93 may include a removable medium, i.e., a portable recording medium. The removable medium is a disc recording medium exemplified by a USB (Universal Serial Bus) memory or a CD (Compact Disc) and a DVD (Digital Versatile Disc). The storage unit 93 is also called a secondary storage device.

The storage unit 93 stores various categories of programs, various items of data and various types of tables on the recording medium in a readable/writable manner. The OS (Operating System), the various categories of programs and the various types of tables are stored in the storage unit 93. Information to be stored in the storage unit 93 may also be stored in the memory 92. Information to be stored in the memory 92 may also be stored in the storage unit 93.

The OS is software operating as an intermediary between the software and the hardware, and for managing a memory space, files, processes and tasks. The OS includes a communication interface. The OS includes a communication interface. The communication interface is a program for transmitting and receiving the data to and from other external devices connected via the communication control unit 96. The external devices embrace, e.g., other information processing apparatuses, external storage devices and other equivalent devices.

The input unit 94 includes a keyboard, a pointing device, a wireless remote controller, a touch panel and other equivalent devices. The input unit 94 may also include a video/image input device instanced by a camera, and a voice/sound input device instanced by a microphone.

The output unit 95 includes a display device instanced by a CRT (Cathode Ray Tube) display, an LCD (Liquid Crystal Display), a PDP (Plasma Display Panel) and an EL Electroluminescence) panel, and an output device instanced by a printer. The output unit 95 may also include a voice/sound output device instanced by a loudspeaker.

The communication control unit 96 establishes connections to other apparatuses and controls communications between the information processing apparatus 90 and other apparatuses. The communication control unit 96 is instanced by a LAN (Local Area Network) interface board, a wireless communication circuit for wireless communications exemplified by Bluetooth (registered trademark), and a communication circuit for telephone communications. The LAN interface board and the wireless communication circuit are connected to a network exemplified by the Internet.

Processors load programs stored in the secondary storage devices into the main storage devices and run the programs, whereby computers, which attain the control device 20, the terminal 30, the server 40 and the terminal 50, implement respective functions. The storage units of the respective devices are provided in storage areas of the main storage devices or the secondary storage devices.

<Operational Example>
<<Change of Settings>>

Figure 8:
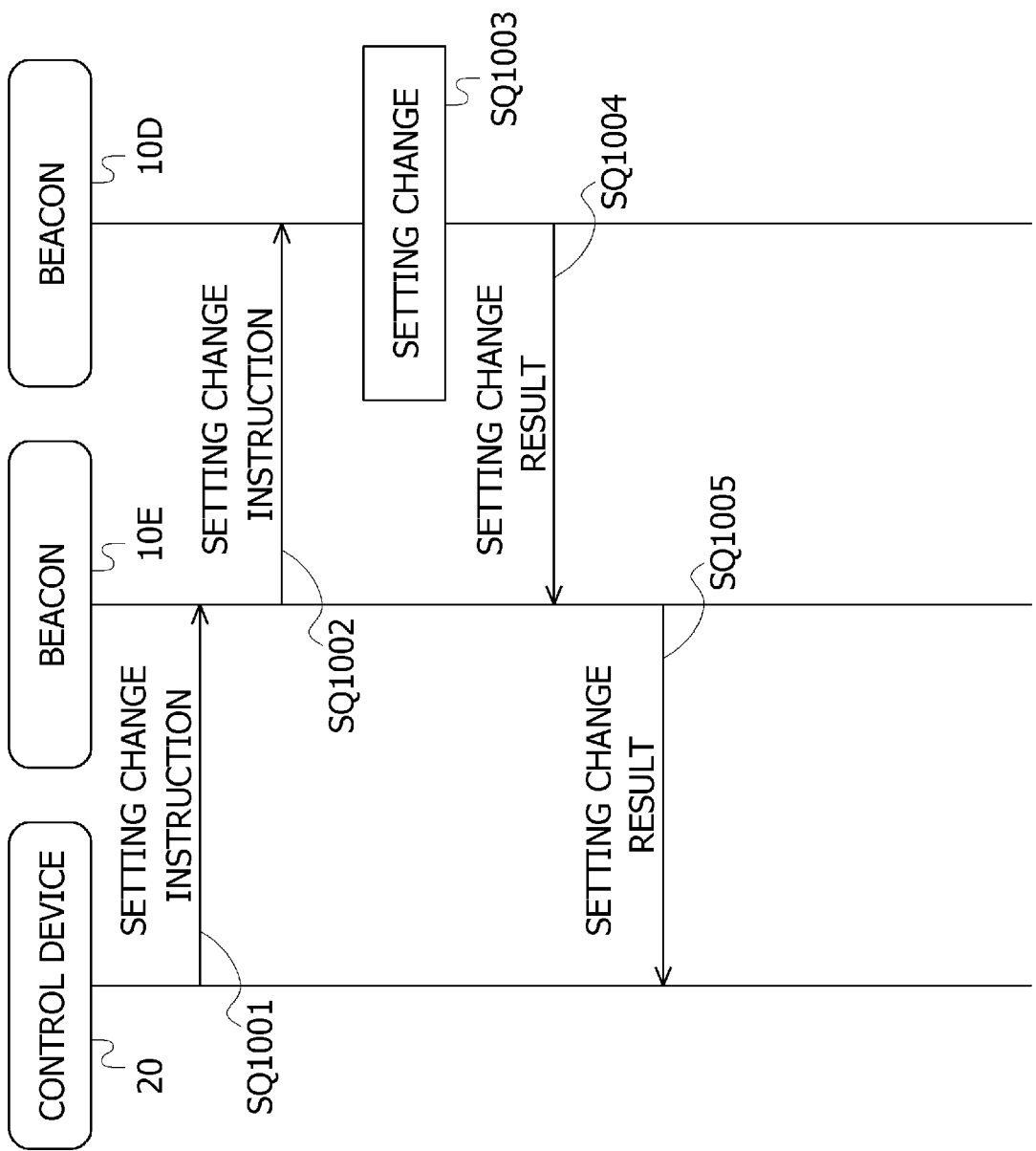
FIG. 8 is a sequence chart illustrating an example of an operation sequence when the control device changes settings of the beacons within a beacon mesh.

FIG. 8 is a sequence chart illustrating an example of an operation sequence when the control device changes settings of the beacons within the beacon mesh. Herein, the control device 20 changes the settings of the beacons 10 in the system as depicted in FIG. 1. Each of the beacons configuring the beacon mesh is installed in a predetermined space instanced by the underground street and the tunnel. All of the beacons 10 are installed in positions enabling the communications with any other beacons 10. At least one of the beacons 10 is installed in a position enabling notification to the control device 20. The terminal 30 is to exist in a position enabling the terminal 30 to receive the radiophare from at least one of the beacons 10.

In SQ1001, the control device 20 transmits a signal containing an instruction (command) for changing the setting of the beacon 10D toward to the beacons 10 configuring the beacon mesh including the beacon 10D. This signal is, e.g., an advertisement signal (broadcast signal). The signal to be transmitted from the control device 20 may also be a predetermined data signal, of which a data size is approximately 10 bytes used in Bluetooth-based mesh communications. The signal used in the mesh communications may be smaller than the advertisement signal. The former signal contains the identifying information for identifying the beacon 10D. The signal sent from the control device 20 is receivable by the plurality of beacons 10. Herein, the signal from the control device 20 is to be received by the beacon 10E. The control device 20 may also transmit this signal as the radiophare of the beacon. The setting change instruction may contain increasing/decreasing an output, starting/stopping the output, detecting the reception strength of the signal, adjusting a timer, detecting a battery residual quantity, and detecting various items of states. A signal containing the instruction of changing the settings of the other beacons 10 exclusive of the beacon 10D is transmittable by the control device 20. The control device 20 may transmit the signal containing the setting change instruction on the basis of a predetermine schedule.

The beacon 10E receiving the signal from the control device 20 checks a content of the signal. The beacon 10E checks whether the information contained in the received signal contains self-identifying-information and the setting change instruction for the self-beacon. An assumption herein is that this signal does not contain the identifying information of the beacon 10E. The beacon 10E stores the information contained in the received signal in the storage unit 13.

In SQ1002, the beacon 10E transmits the signal sent from the control device 20 toward the peripheral beacons 10. When the signal sent from the control device 20 is the same as the signal transmitted before, the beacon 10E does not transmit this signal. Herein, this signal is to be received by the beacon 10D.

The beacon 10D receiving the signal from the beacon 10E checks a content of the signal. The beacon 10D checks whether the information contained in the received signal contains the self-identifying-information and the setting change instruction for the self-beacon. An assumption herein is that this signal contains the identifying information of the beacon 10D. The beacon 10D stores the information contained in the received signal in the storage unit 13.

In SQ1003, the beacon 10D, when recognizing that the received signal contains the self-identifying-information, checks the setting change instruction contained in the received signal. The beacon 10D changes the setting of the beacon 10D in accordance with the setting change instruction. The setting change instruction is given for, e.g., increasing or decreasing the output. At this time, the beacon 10D increases or decreases a setting value (transmission electric power) of the transmission output by one step. The setting change instruction may contain, in addition to the above, starting/stopping the output, adjusting the timer, detecting the reception strength of the signal, detecting the battery residual quantity, and detecting the various items of states. The setting change instruction is recognized by the beacon 10, based on a bit value of a predetermined position within the signal, which is previously settled between the control device 20 and each of the beacons 10.

In SQ1004, the beacon 10D transmits the signal containing information about a setting change result toward the control device 20. The setting change result is exemplified by a post-changing setting value of the output, a post-changing reception strength, a post-changing battery residual quantity, post-changing values of the variety of meters, and post-changing detection values. The setting change result may take a value based on each of the post-changing setting value of the output, the post-changing reception strength, the post-changing battery residual quantity, the post-changing values of the variety of meters, and the post-changing detection values in order to reduce a data size. The signal described above is, e.g., the advertisement signal (broadcast signal). This signal may also be a data signal that is as small as about 10 bytes used in the Bluetooth-based mesh communications. The signal may contain the identifying information for identifying the control device 20 as information specifying the control device 20 as a destination. The signal may also contain the identifying information for identifying the control device 20 as information specifying the beacon 10D as a transmission source of the signal. The setting change result is expressed by the bit value of the predetermined position within the signal, which is previously settled between the control device 20 and each of the beacons 10. Herein, the signal is to be received by the beacon 10E.

The beacon 10E receiving the signal from the beacon 10D checks a content of the signal. The beacon 10E checks whether the information contained in the received signal contains self-identifying-information and the setting change instruction for the self-beacon. An assumption herein is that this signal does not contain the identifying information of the beacon 10E. The beacon 10E stores the information contained in the received signal in the storage unit 13.

In SQ1005, the beacon 10E transmits the signal sent from the beacon 10D toward the peripheral beacons 10. When the signal sent from the beacon 10D is the same as the signal transmitted before, the beacon 10E does not transmit this signal. Herein, this signal is to be received by the control device 20.

The control device 20 receiving the signal from the beacon 10E checks a content of the signal. The control device 20 checks whether the information contained in the received signal contains the self-identifying-information. An assumption herein is that this signal contains the identifying information of the control device 20. The control device 20 stores the information contained in the received signal in the storage unit 23.

The control device 20 checks the information contained in the signal received from the beacon 10E. This information enables the control device 20 to recognize the setting change result with respect to the setting change instruction made for the beacon 10D.

The control device 20 is enabled to made the setting change instruction for the beacon 10D by employing the data signal used in the Bluetooth-based mesh communications. It is feasible for the control device 20 to check a content of the setting change by receiving the setting change result from the beacon 10D. For example, when sending an ACK (ACKnowledge)/retransmission request as in the case of Three Way Handshaking in TCP, a packet is accurately transmitted and received, whereby it is possible to check whether the setting is changed, in which case, however, this leads to an increase in number of packets, and a communication efficiency decreases. Herein, the data signal used in the Bluetooth-based mesh communications is employed in the beacon mesh, and the control device 20 is thereby enabled to recognize the setting change result while restraining a rise in signal quantity.

<<Time Synchronization>>

FIG. 9 is a sequence chart illustrating an example of an operation sequence when synchronizing the time in the beacons within the beacon mesh. When the beacons 10 within the beacon mesh are battery-driven, it is requested to reduce a quantity of power consumption per time, which is used by the beacons 10, by decreasing a period of time for which the beacons 10 operate. It is feasible to decrease a frequency of replacing the battery by reducing the quantity of power consumption per time. It is, however, difficult to transmit and receive the signal unless time zones in which the beacons 10 operate are arranged within the beacon mesh. Such being the case, it is requested to conduct time synchronization within the beacon mesh. Made herein is a description of how the time synchronization among the beacons 10 within the beacon mesh is conducted based on the signal given from the control device 20.

In SQ2001, the control device 20 transmits a signal (time synchronizing command, time synchronizing signal) containing a time synchronizing instruction (command) toward all of the beacons 10 within the beacon mesh. This signal is, e.g., the advertisement signal (broadcast signal). The signal to be transmitted from the control device 20 may also be a predetermined data signal, of which a data size is approximately 10 bytes used in the Bluetooth-based mesh communications. The signal used in the mesh communications may be smaller than the advertisement signal. The former signal contains information representing the time synchronizing instruction. The signal sent from the control device 20 is receivable by the plurality of beacons 10. Herein, the signal from the control device 20 is to be received by the beacon 10E. The control device 20 may also transmit this signal as the radiophare of the beacon. The time synchronizing instruction may contain instructions other than the time synchronizing instruction. The control device 20 may transmit the signal containing the time synchronizing instruction, based on a predetermined schedule. This signal may contain identifying information for identifying the signal of this time.

The beacon 10E receiving the signal sent from the control device 20 checks a content of the signal. Herein, the beacon 10E recognizes the received signal as the time synchronizing signal from information contained in the received signal. The beacon 10E stores the information contained in the received signal in the storage unit 13.

In SQ2002, the beacon 10E transmits the signal sent from the control device 20 to the peripheral beacons 10. When the signal sent from the control device 20 is the same as the signal transmitted before, the beacon 10E does not transmit this signal. Herein, this signal is to be received by the beacon 10D.

The beacon 10D receiving the signal from the beacon 10E checks a content of this signal. Herein, the beacon 10D recognizes the received signal as the time synchronizing signal from the information contained in the received signal. The beacon 10D stores information contained in the received signal in the storage unit 13.

The beacon 10D, similarly to the beacon 10E, transmits the signal received from the beacon 10E to the peripheral beacons 10. When the signal from the control device 20 is the same as the signal transmitted before, the beacon 10D does not transmit this signal.

In SQ2003, each of the beacons 10 (the beacon 10D, the beacon 10E and other equivalent beacons) receiving the time synchronizing signal sets the time of a self-built-in timer to predetermined reference time (e.g., time "0"). Herein, the time synchronizing signals are sequentially transferred within the beacon mesh, and hence time lags in timing are caused when the respective beacons 10 receive the time synchronizing signals, and the respective beacons 10 may, however, be deemed to receive the time synchronizing signals almost simultaneously according to a time scale dealt with herein. The built-in timer of the beacon 10 counts the time.

In SQ2004, the beacon 10 sets the self device in a sleep mode for a predetermined period of time. The beacon 10 stops transmitting and receiving the signal for a sleeping time of the beacon 10. It is thereby feasible to restrain the power consumption of the beacon 10.

In SQ2005, the beacon 10, when the predetermined period of time elapses since sleeping in SQ2004, transmits and receives the signal for the predetermined period of time. This contrivance enables the beacon 10 to transmit and receive the signal in the same zone as those of other beacons 10.

Hereafter, the processes in SQ2004 and SQ2005 are iterated in each of the beacons 10. This process is stopped when receiving the next time synchronizing signal. A sleeping time length and a transmission/reception time length of the beacon 10 may be previously settled and may also be designated in the time synchronizing signal. For example, the time synchronizing signals are periodically transmitted from the control device 20, thereby enabling obviation of a time deviation caused due to an individual difference between the built-in timers of the beacons 10. The time synchronizing signals are periodically transmitted from the control device 20, thereby enabling the time synchronization to be done even when a new beacon 10 is added onto the beacon mesh. The peripheral beacons 10 recognizing the addition of the new beacon 10 within the beacon mesh may perform the time synchronization by transmitting the signals each containing the elapse time since the reference time to the new beacon 10. Such a possibility exists that there are errors in time of the timers of the beacons 10 transmitting the signals each containing the elapse time since the reference to the new beacon 10. When the erroneous time is set in the timer of the beacon 10, this beacon 10 is disabled from receiving the signals from other beacons 10 and the control device 20 as the case may be. Such being the case, the beacon 10 does not receive the signal (the time synchronizing signal and other equivalent signals) from the control device 20 for a predetermined period, in which case this beacon 10 determines that the time of the timer is erroneous and may keep a receiving status without sleeping till receiving the signal from the control device 20. The beacon 10 is thereby enabled to adjust the erroneous time to the correct time even when the time of the timer of the beacon 10 deviates.

This contrivance enables the time synchronization to be easily done among the timers of the beacons 10 within the beacon mesh. The timers are synchronized in time, whereby it is possible to make the transmission/reception time zones of the beacons 10 coincident with each other within the beacon mesh and to save the electric power of the beacons 10.

<<Scanning of Sensor Information>>

Described herein is an operation when acquiring information of the sensors pertaining to the beacons within the beacon mesh. The beacons 10 configuring the beacon mesh are enabled to transmit and receive Bluetooth-based packets. With this function being utilized, the control device 20 collects the Bluetooth-based packets (detection signals) using the external sensors through mesh communications in the beacon mesh, thereby enabling a sensor network to be configured. The Bluetooth-based packet using the external sensor contains a detection result of some sort of physical quantity, which is given by the external sensor. Detection results of the internal sensors built in the beacons 10 configuring the beacon mesh may also be collected by the control device 20 by being carried on the Bluetooth-based packets. At this time, in the sequence of FIG. 8, in the same way as transmitting the setting change result to the control device 20 from the beacon 10D, the detection results (the sensor information and other equivalent items) of the variety of sensors are collectible by the control device 20. Each beacon 10 may transfer the received Bluetooth-based packet using the external sensor as it is toward the control device 20.

The information transmitted to the control device 20 from the variety of sensors and the beacons 10 may also take values based on the detection results for reducing the data size. The data size of the values based on the detection result is reducible by filtering the detection results. The control device 20 may calculate positions of the external sensors by collecting transmission electric power of the external sensors and reception electric power of the signals from the external sensors in the beacons 10. A magnitude of the reception electric power depends on a distance from the beacon 10, and it is therefore feasible to calculate the positions of the external sensors because of knowing the distances from the plurality of beacons 10 to the external sensors when the signals from the external sensors are receivable by the plurality of beacons 10.

(Operation and Effect of Embodiment)

The beacon 10 in the beacon mesh according to the embodiment receives the signal containing the setting change instruction from the control device 20. The beacon 10 changes the setting in accordance with the setting change instruction. The beacon 10 transmits the signal containing the setting change result toward the control device 20. The beacon 10 uses the packet for the mesh communications in the beacon mesh and is enabled to transmit the setting change result.

The control device 20 in the beacon mesh according to the embodiment transmits the time synchronizing signal toward the beacons 10 within the beacon mesh. Each of the beacons 10 receiving the time synchronizing signal sets the time of the built-in timer to the reference time. Each of the beacons 10 sleeps for the predetermined period. Each of the beacons 10 transmits and receives the signal for the predetermined period after the elapse of the predetermined sleeping period. It is thereby possible to restrain the power consumption in the beacon 10.

The beacon 10 according to the embodiment receives the radio signal containing the detection result of the external sensor, and is enabled to transmit the received signal toward the control device 20. The detection result of the external sensor is obtainable by the control device 20 via the beacon mesh.

The present invention is not limited to the embodiment discussed above, and embodiments may be varied and combined within a range that does not deviate from the gist of the present invention.

<Non-Transitory Computer Readable Recording Medium>

A program making a computer, other machines and apparatuses (which will hereinafter be referred to as the computer and other equivalents) attain any one of the functions, can be recorded on a non-transitory recording medium readable by the computer and other equivalents. The computer and other equivalents are made to read and run the program on this non-transitory recording medium, whereby the function thereof can be provided.

Herein, the non-transitory recording medium readable by the computer and other equivalents connotes a non-transitory recording medium capable of accumulating information instanced by data, programs and other equivalents electrically, magnetically, optically, mechanically or by chemical action, which can be read from the computer and other equivalents. In such a non-transitory recording medium, computer building components instanced by the CPU and the memory are provided, and the CPU thereof may be made to run the program.

Among these non-transitory recording mediums, the mediums removable from the computer and other equivalents are exemplified by a flexible disc, a magneto-optic disc, a CD-ROM, a CD-R/W, a DVD, a DAT, an 8 mm tape, and a memory card.

A hard disc, a ROM and other equivalents are given as the non-transitory recording mediums fixed within the computer and other equivalents.

BRIEF DESCRIPTION OF REFERENCE NUMERALS AND SYMBOLS 10 beacon
11 radiophare information transmitting unit
12 mutual communication unit
13 storage unit
20 control device
21 beacon communication unit
22 information acquiring unit
23 storage unit
30 terminal
31 radiophare information transmitting unit
32 mutual communication unit
33 storage unit
34 display unit
40 server
41 communication unit
42 arithmetic unit
43 storage unit
50 terminal
51 communication unit
52 storage unit
53 display unit
60 network

What is claimed is:

1. A beacon in a system including: a plurality of beacons enabled to perform mutual communications within a predetermined radio wave reachable distance and transmitting and receiving predetermined signals, each of the plural beacons being disposed within the radio wave reachable distance of at least one of other beacons; and a control device enabled to perform the communications with at least one of the plural beacons, the beacon comprising:

receiving unit to receive a signal containing a setting change instruction issued from the control device;

setting unit to change a setting value of a predetermined item of a self device, based on the setting change instruction; and transmitting unit to transmit a signal containing information based on the setting value changed by the setting unit toward the control device, wherein the receiving unit receives a signal containing a time synchronizing instruction issued from the control device, the setting unit sets time of a timer operating in the self device to reference time, based on the time synchronizing instruction, and sets the self device in a sleep mode for a predetermined period of time, the receiving unit receives signals from other devices when the time of the timer is within a predetermined period, and the transmitting unit transmits the signal to other devices when the time of the timer is within the predetermined period.

2. The beacon according to claim 1, wherein the receiving unit receives a detection signal containing detection results of physical quantities given by other sensors, and the transmitting unit transmits a signal containing the detection signal toward the control device.

* * * * *